(12) United States Patent
Koyama (10) Patent No.: US 12,257,796 B2
(45) Date of Patent: Mar. 25, 2025

(54) METHOD FOR MANUFACTURING PNEUMATIC TIRE

(71) Applicant: The Yokohama Rubber Co., LTD., Tokyo (JP)

(72) Inventor: Noriyoshi Koyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 564 days.

(21) Appl. No.: 17/594,441

(22) PCT Filed: Apr. 1, 2020

(86) PCT No.: PCT/JP2020/015107
§ 371 (c)(1),
(2) Date: Oct. 15, 2021

(87) PCT Pub. No.: WO2020/217913
PCT Pub. Date: Oct. 29, 2020

(65) Prior Publication Data
US 2022/0184910 A1      Jun. 16, 2022

(30) Foreign Application Priority Data
Apr. 24, 2019    (JP) .................................. 2019-083160

(51) Int. Cl.
*B29D 30/30*      (2006.01)
(52) U.S. Cl.
CPC ................. *B29D 30/3021* (2013.01)
(58) Field of Classification Search
CPC .... B29D 30/08; B29D 30/16; B29D 30/1621; B29D 30/30; B29D 30/3021; B29D 30/38;
(Continued)

(56) References Cited

U.S. PATENT DOCUMENTS

| 4,987,938 A * | 1/1991 | Ushikubo | B60C 9/2204 |
|---|---|---|---|
| | | | 152/533 |
| 2006/0042737 A1* | 3/2006 | Hayashi | B29D 30/60 |
| | | | 152/209.1 |

FOREIGN PATENT DOCUMENTS

| DE | 4212295 A1 * | 10/1993 | ............ B60C 9/2204 |
|---|---|---|---|
| EP | 712739 A1 * | 5/1996 | ......... B29D 30/3028 |

(Continued)

OTHER PUBLICATIONS

Baumhoefer J J, DE-4212295-A1, machine translation. (Year: 1993).*

(Continued)

*Primary Examiner* — Sedef E Paquette
(74) *Attorney, Agent, or Firm* — Thorpe North & Western (57) ABSTRACT

A method for manufacturing a pneumatic tire includes: using a first cover material and a second cover material in a belt cover material and spirally winding the first cover material from a second side to a shoulder region on a first side; spirally winding the second cover material from the first side to a shoulder region on the second side; spirally winding the first cover material from the shoulder region on the first side to a tire equatorial plane; and spirally winding the second cover material from the shoulder region on the second side to the tire equatorial plane, the first cover material and the second cover material being layered in a region between a portion of the first cover material that is located on the second side and a portion of the second cover material that is located on the first side, thereby forming an overlapping portion.

4 Claims, 8 Drawing Sheets

(58) Field of Classification Search
CPC .............. B29D 30/42; B29D 2030/423; B29D 2030/427; B60C 9/18; B60C 2009/2035
USPC ................................................. 156/117, 130
See application file for complete search history.

(56) References Cited

FOREIGN PATENT DOCUMENTS

| | | | |
|---|---|---|---|
| JP | 1-254404 | A | 10/1989 |
| JP | 4-201553 | A | 7/1992 |
| JP | 06183207 | A * | 7/1994 |
| JP | 8-142226 | A | 6/1996 |
| JP | 2003-276405 | A | 9/2003 |
| JP | 2006-240498 | A | 9/2006 |
| JP | 2007-69408 | A | 3/2007 |
| JP | 2010-064644 | A | 3/2010 |
| JP | 4635366 | B2 | 2/2011 |
| JP | 4687201 | B2 | 5/2011 |
| JP | 4865259 | B2 | 2/2012 |
| JP | 2013-39761 | A | 2/2013 |
| JP | 2017-137032 | A | 8/2017 |
| JP | 2020-40423 | A | 3/2020 |
| WO | 2016/204010 | A1 | 12/2016 |

OTHER PUBLICATIONS

Watanabe S, JP-4865259-B2, machine translation. (Year: 2012).*
Goto A, JP-06183207-A, machine translation. (Year: 1994).*

* cited by examiner

|  | Comparative Example 1 | Comparative Example 2 | Example 1 | Example 2 | Example 3 | Example 4 | Example 5 | Example 6 |
|---|---|---|---|---|---|---|---|---|
| Presence of overlapping portion | No | Yes | Yes | Yes | Yes | Yes | Yes | Yes |
| Number of belt cover materials | 1 | 3 | 2 | 2 | 2 | 2 | 2 | 2 |
| Width of overlapping portion | 0 mm | 20 mm | 20 mm | 20 mm | 4 mm | 5 mm | 40 mm | 41 mm |
| Simultaneous winding of belt cover materials | - | No | No | Yes | Yes | Yes | Yes | Yes |
| Plunger test (J) | 580 | 642 | 642 | 642 | 611 | 624 | 658 | 658 |
| Productivity | 100 | 65 | 100 | 188 | 200 | 198 | 180 | 176 |

FIG. 8

METHOD FOR MANUFACTURING PNEUMATIC TIRE

TECHNICAL FIELD

The present technology relates to a method for manufacturing a pneumatic tire.

BACKGROUND ART

Some pneumatic tires in the related art have achieved desired performance by devising a member disposed on an outer side in a tire radial direction of a belt layer. For example, a pneumatic tire described in Japan Patent No. 4865259 improves projection resistance in such a way that two belt protecting layers are disposed on an outer side in a tire radial direction of a belt layer, and the belt protecting layer on the outer side in the tire radial direction has a narrower width than a width of the belt protecting layer on an inner side in the tire radial direction. In a pneumatic tire described in Japan Unexamined Patent Publication No. 2010-64644, a belt reinforcing layer is disposed between a tread portion and a belt layer, and the belt reinforcing layer is configured to be three layers on a tire equatorial portion to ensure breaking energy while suppressing an increase in weight.

A pneumatic tire described in Japan Unexamined Patent Publication No. 2017-137032 includes a band-like sound absorbing member adhered to a tire inner surface in a tread portion, a full cover layer disposed on an outer circumferential side of a belt layer, and a center cover layer disposed on an outer circumferential side of the full cover layer and locally covering a tire width central region. By defining respective widths of the band-like sound absorbing member and the belt layer and widths of the center cover layer and the band-like sound absorbing member, a decrease in high-speed durability caused by accumulation of heat in the band-like sound absorbing member is reduced while obtaining sufficient quietness by the band-like sound absorbing member.

In a pneumatic tire described in Japan Patent No. 4635366, a belt cover layer constituted by an end portion belt cover layer and a central portion belt cover layer is disposed outside a belt layer, and a tensile strength of organic fiber cords forming the end portion belt cover layer and the central portion belt cover layer and a sum of the end portion belt cover layer and the central portion belt cover layer are defined to ensure reduction in road noise in a high frequency band and weight reduction. Additionally, a pneumatic tire described in Japan Patent No. 4687201 includes a belt cover formed by spirally winding a strip material on an outer circumferential side of a belt layer. In the belt cover, lap winding of the strip material at a position covering an end portion in a tire width direction in the belt layer and a position covering a central portion in the tire width direction in the belt layer improves steering stability and durability.

Here, among pneumatic tires, for example, there are pneumatic tires that can accommodate a high load, such as a pneumatic tire with EXTRA LOAD standard. Such pneumatic tires can be used at relatively high air pressures for accommodating high loads. Meanwhile, when the air pressure of the pneumatic tire is increased, rigidity of a tread portion increases. As a result, the tread portion is less likely to deform when a foreign material is trodden, and a shock burst, which is caused by the foreign material being trodden, is likely to occur. That is, the use of the pneumatic tire at high air pressure is likely to reduce shock burst resistance performance, which is a resistance against a shock burst.

A shock burst is likely to occur by treading on a foreign material on a road surface with a region at or near a tire equatorial plane on a ground contact surface of the tread portion. Accordingly, to improve shock burst resistance performance, reinforcement at or near the tire equatorial plane in the tread portion is effective. However, new addition of a member for reinforcement increases a manufacturing process by that much, thereby reducing productivity. For this reason, achieving both shock burst resistance performance and productivity in a compatible manner has been extremely difficult.

SUMMARY

The present technology provides a method for manufacturing a pneumatic tire that is capable of achieving both shock burst resistance performance and productivity in a compatible manner.

A method for manufacturing a pneumatic tire according to the present technology is a method for manufacturing a pneumatic tire that disposes a belt cover layer on an outer side of a belt layer in a tire radial direction by winding a band-like belt cover material into a spiral shape around a tire rotation axis, the method including: a step of using a first cover material and a second cover material in the belt cover material and, with one side in a tire width direction with respect to a tire equatorial plane being defined as a first side and an other side in the tire width direction with respect to the tire equatorial plane being defined as a second side, spirally winding the first cover material from a position between a shoulder region on the second side and the tire equatorial plane to a shoulder region on the first side; a step of spirally winding the second cover material from a position between the shoulder region on the first side and the tire equatorial plane to the shoulder region on the second side; a step of spirally winding the first cover material from the shoulder region on the first side to the tire equatorial plane; and a step of spirally winding the second cover material from the shoulder region on the second side to the tire equatorial plane, the first cover material and the second cover material, as well as the first cover materials and the second cover materials, being layered in the tire radial direction, in a region between a portion of the first cover material that is located on the second side and a portion of the second cover material that is located on the first side, thereby forming an overlapping portion.

In the method for manufacturing a pneumatic tire described above, winding of the first cover material and winding of the second cover material are preferably started simultaneously.

In the method for manufacturing a pneumatic tire described above, the overlapping portion preferably has a width in the tire width direction within a range of 5 mm or more and 40 mm or less.

The method for manufacturing a pneumatic tire according to embodiments of the present technology can achieve the effect of achieving both shock burst resistance performance and productivity in a compatible manner.

DETAILED DESCRIPTION

Embodiments of a method for manufacturing a pneumatic tire according to the present technology are described hereinafter in detail with reference to the drawings. However, the present technology is not limited by the embodiment. Constituents of the following embodiments include elements that are essentially identical or that can be substituted or easily conceived of by a person skilled in the art.

Embodiments

Pneumatic Tire

In the following description, the term "tire radial direction" refers to a direction orthogonal to the tire rotation axis (not illustrated) which is a rotation axis of a pneumatic tire 1, the term "inner side in the tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equatorial line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. The term "tire equator line" refers to a line in the tire circumferential direction of the pneumatic tire 1 that lies on the tire equatorial plane CL.

Figure 1:
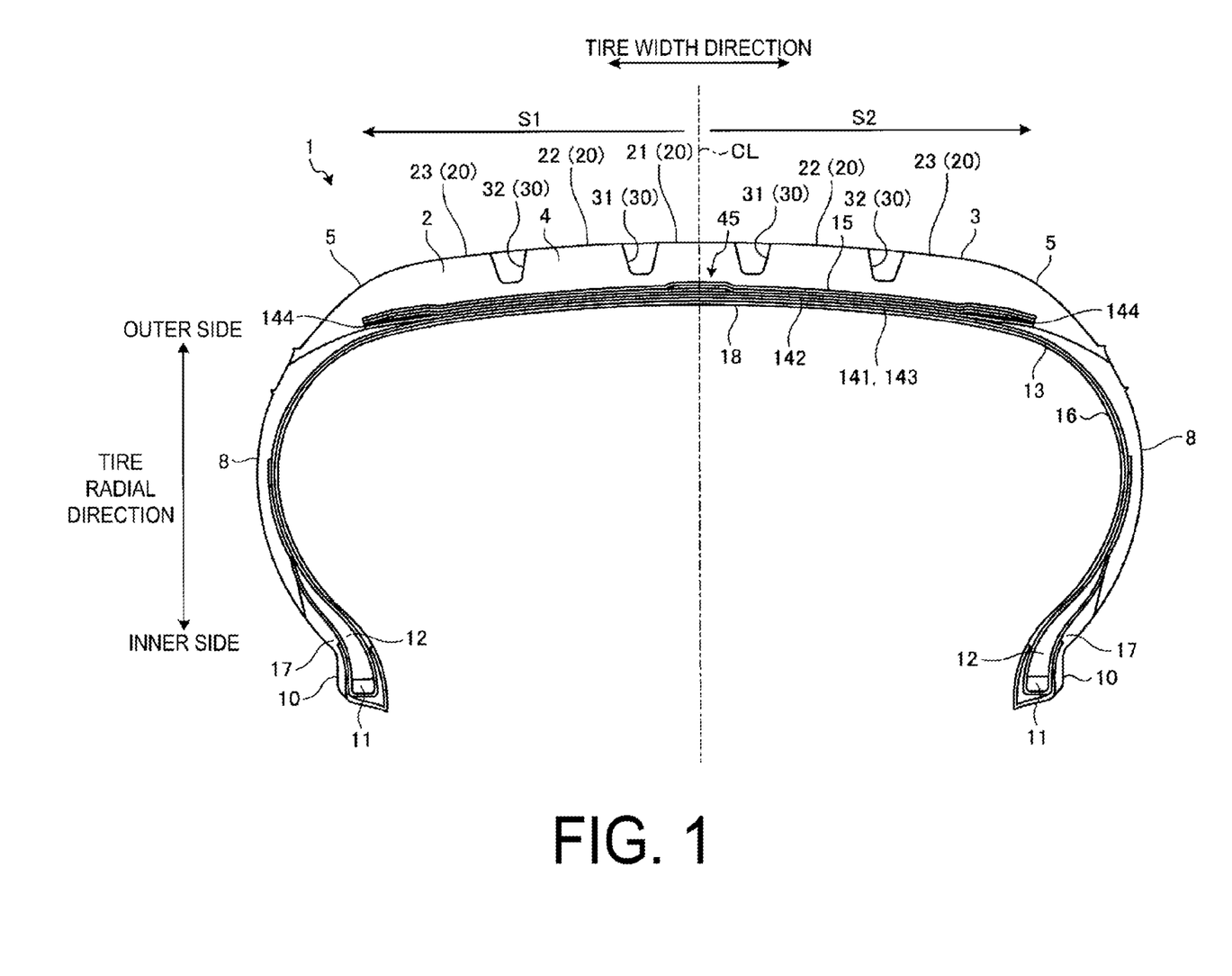
FIG. 1 is a meridian cross-sectional view illustrating a main portion of a pneumatic tire according to an embodiment.

FIG. 1 is a meridian cross-sectional view illustrating a main portion of the pneumatic tire 1 according to the embodiment. The pneumatic tire 1 according to the present embodiment is the pneumatic tire 1 that can accommodate use at high loads, such as the pneumatic tire 1 with EXTRA LOAD standard. In the pneumatic tire 1 according to the present embodiment, a tread portion 2 is disposed on a portion on the outermost side in the tire radial direction when viewed in a meridian cross-section, and the tread portion 2 includes a tread rubber layer 4 made of a rubber composition. A surface of the tread portion 2, that is, a portion in contact with a road surface during traveling of a vehicle (not illustrated) having the pneumatic tires 1 mounted thereon is formed as a ground contact surface 3, and the ground contact surface 3 forms a part of a contour of the pneumatic tire 1. A plurality of main grooves 30 extending in the tire circumferential direction are formed in the ground contact surface 3 in the tread portion 2, and a plurality of land portions 20 are defined by the plurality of main grooves 30 on the surface of the tread portion 2. In the present embodiment, four main grooves 30 are formed side by side in the tire width direction, and each two of the four main grooves 30 are disposed on both sides in the tire width direction of the tire equatorial plane CL. In other words, the four main grooves 30 in total are formed in the tread portion 2, including: two center main grooves 31 disposed on both sides of the tire equatorial plane CL; and two shoulder main grooves 32 disposed on an outer side in the tire width direction of each of the two center main grooves 31.

Note that "main groove 30" refers to a vertical groove in which at least a part is extending in the tire circumferential direction. In general, the main groove 30 has a groove width 3 mm or more and a groove depth of 6 mm or more and has a tread wear indicator (slip sign) therein, indicating terminal stages of wear. In the present embodiment, the main groove 30 has a groove width within a range of 6 mm or more and 25 mm or less and a groove depth within a range of 6 mm or more and 9 mm or less and is substantially parallel to a tire equator line (centerline) where the tire equatorial plane CL and the ground contact surface 3 intersect. The main grooves 30 may extend linearly in the tire circumferential direction or may be provided in a wave shape or a zigzag shape.

Of the land portions 20 defined by the main grooves 30, the land portion 20 positioned between the two center main grooves 31 and positioned on the tire equatorial plane CL is a center land portion 21. Moreover, the land portions 20 positioned between the adjacent center main grooves 31 and shoulder main grooves 32 and disposed on the outer side in the tire width direction of the center land portion 21 are second land portions 22. Moreover, the land portions 20 positioned on the outer side in the tire width direction of the second land portions 22 and adjacent to the second land portions 22 with the shoulder main grooves 32 disposed therebetween are shoulder land portions 23.

Note that the land portions 20 may be formed in a rib shape across one circumference in the tire circumferential direction, and a plurality of lug grooves (not illustrated) extending in the tire width direction may be formed in the tread portion 2. Thus, the land portions 20 may be defined by the main grooves 30 and the lug grooves, and each of the land portions 20 may be formed in a block shape. In the present embodiment, the land portion 20 is formed as the rib-shaped land portion 20 formed across one circumference in the tire circumferential direction.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. Each bead portion 10 is provided with a bead core 11, and a bead filler 12 is provided on an outer side in the tire radial direction of the bead core 11. The bead core 11 is an annular member formed in an annular shape by bundling bead wires, which are steel wires, and the bead filler 12 is a rubber member disposed on the outer side in the tire radial direction of the bead core 11.

A belt layer 14 is disposed in the tread portion 2. The belt layer 14 is formed by a multilayer structure in which a plurality of belts 141, 142 are layered, and the two layers of the belts 141, 142 are layered in the present embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, of 20° or more and 55° or less). Furthermore, the belt angles of the two layers of the belts 141, 142 differ from each other. Accordingly, the belt layer 14 is configured as a so-called crossply structure in which the two layers of the belts 141, 142 are layered with the inclination directions of the belt cords intersecting with each other. In other words, the two layers of the belts 141, 142 are provided as so-called cross belts in which the belt cords provided with the respective belts 141, 142 are disposed in mutually intersecting orientations.

A belt cover layer 15 is disposed on the outer side in the tire radial direction of the belt layer 14. The belt cover layer 15 is disposed on the outer side in the tire radial direction of the belt layer 14, covers the belt layer 14 in the tire circumferential direction, and is provided as a reinforcing layer that reinforces the belt layer 14. The belt cover layer 15 is formed by covering, with coating rubber, a plurality of cords (not illustrated) disposed side by side in the tire width direction substantially parallel to the tire circumferential direction. The cords provided with the belt cover layer 15 are made of, for example, steel or an organic fiber, such as polyester, polyethylene terephthalate, rayon, nylon, and a hybrid of a polyamide composite+α, and a cord angle is within a range of ±5° with respect to the tire circumferential direction. Moreover, in the cords provided with the belt cover layer 15, a wire diameter, which is a diameter of the cord, is within a range of 0.5 mm or more and 1.8 mm or less, and a cord count per 50 mm in an arrangement direction of the cords is within a range of 30 or more and 80 or less. In the present embodiment, the belt cover layer 15 is disposed across the entire region of the range in the tire width direction in which the belt layer 14 is disposed and covers end portions in the tire width direction of the belt layer 14. The tread rubber layer 4 provided with the tread portion 2 is disposed on the outer side in the tire radial direction of the belt cover layer 15 in the tread portion 2.

A carcass layer 13 containing the cords of radial plies is continuously provided on an inner side in the tire radial direction of the belt layer 14 and on a side of the sidewall portion 8 close to the tire equatorial plane CL. Accordingly, the pneumatic tire 1 according to the present embodiment is configured as a so-called radial tire. The carcass layer 13 has a single layer structure made of one carcass ply or a multilayer structure made of a plurality of carcass plies, and spans between the pair of bead portions 10 disposed on both sides in the tire width direction in a toroidal shape to form the framework of the tire.

Specifically, the carcass layer 13 is disposed to span from one bead portion 10 to the other bead portion 10 among the pair of bead portions 10 located on both sides in the tire width direction and turns back toward the outer side in the tire width direction along the bead cores 11 at the bead portions 10 so as to wrap around the bead cores 11 and the bead fillers 12. The bead filler 12 is a rubber member disposed in a space formed on the outer side in the tire radial direction of the bead core 11 when the carcass layer 13 is folded back at the bead portion 10. Moreover, the belt layer 14 is disposed on the outer side in the tire radial direction of a portion, located in the tread portion 2, of the carcass layer 13 spanning between the pair of bead portions 10. Moreover, the carcass ply of the carcass layer 13 is made by rolling and covering, with coating rubber, a plurality of carcass cords made from steel or an organic fiber material such as aramid, nylon, polyester, or rayon. The plurality of carcass cords that form the carcass ply are disposed side by side with an angle in the tire circumferential direction, the angle with respect to the tire circumferential direction following a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner side of the carcass layer 13 in the pneumatic tire 1. The innerliner 16 forms a tire inner surface 18 that is a surface on the inner side of the pneumatic tire 1.

Figure 2:
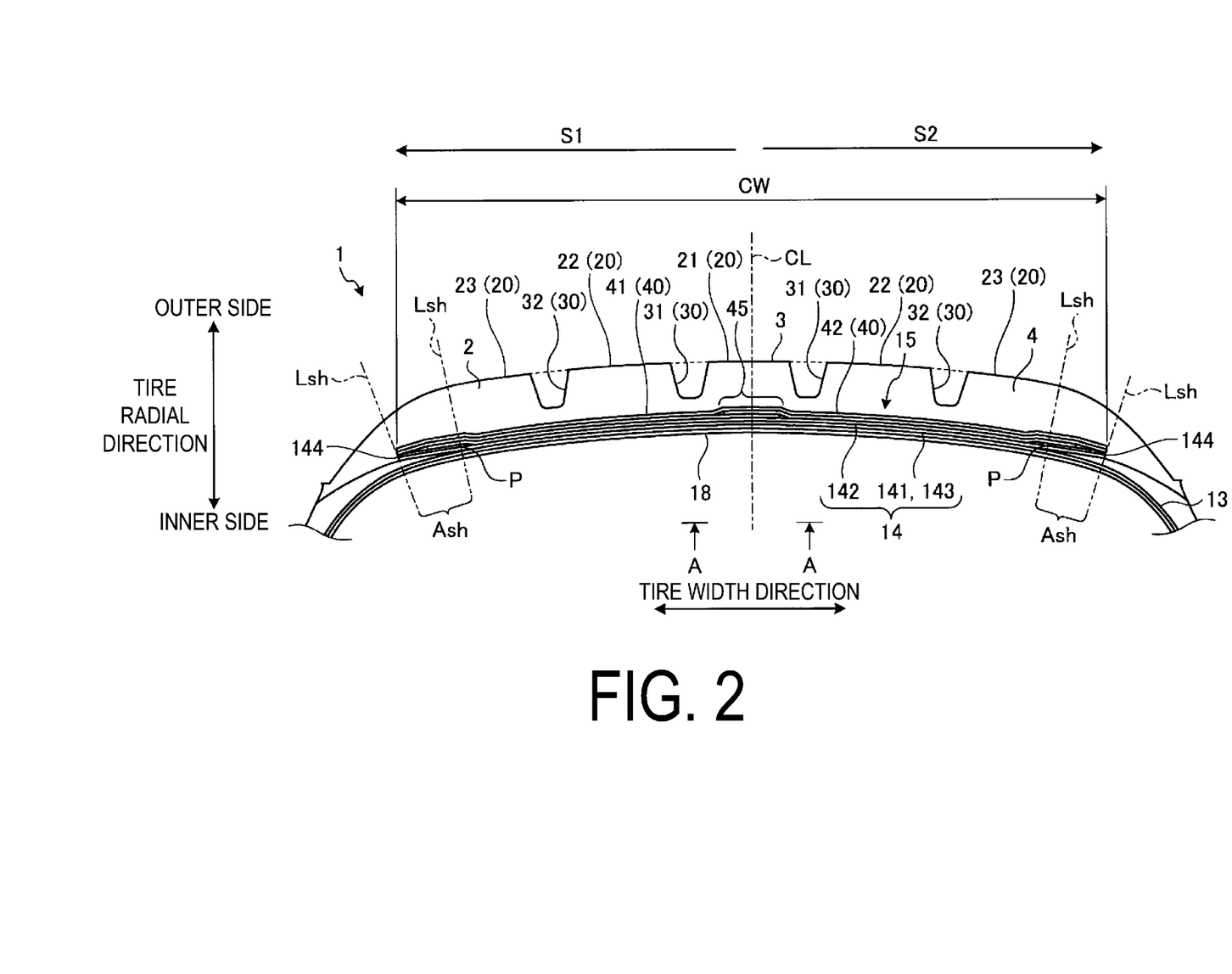
FIG. 2 is a detailed view of a tread portion illustrated in FIG. 1.
Figure 3:
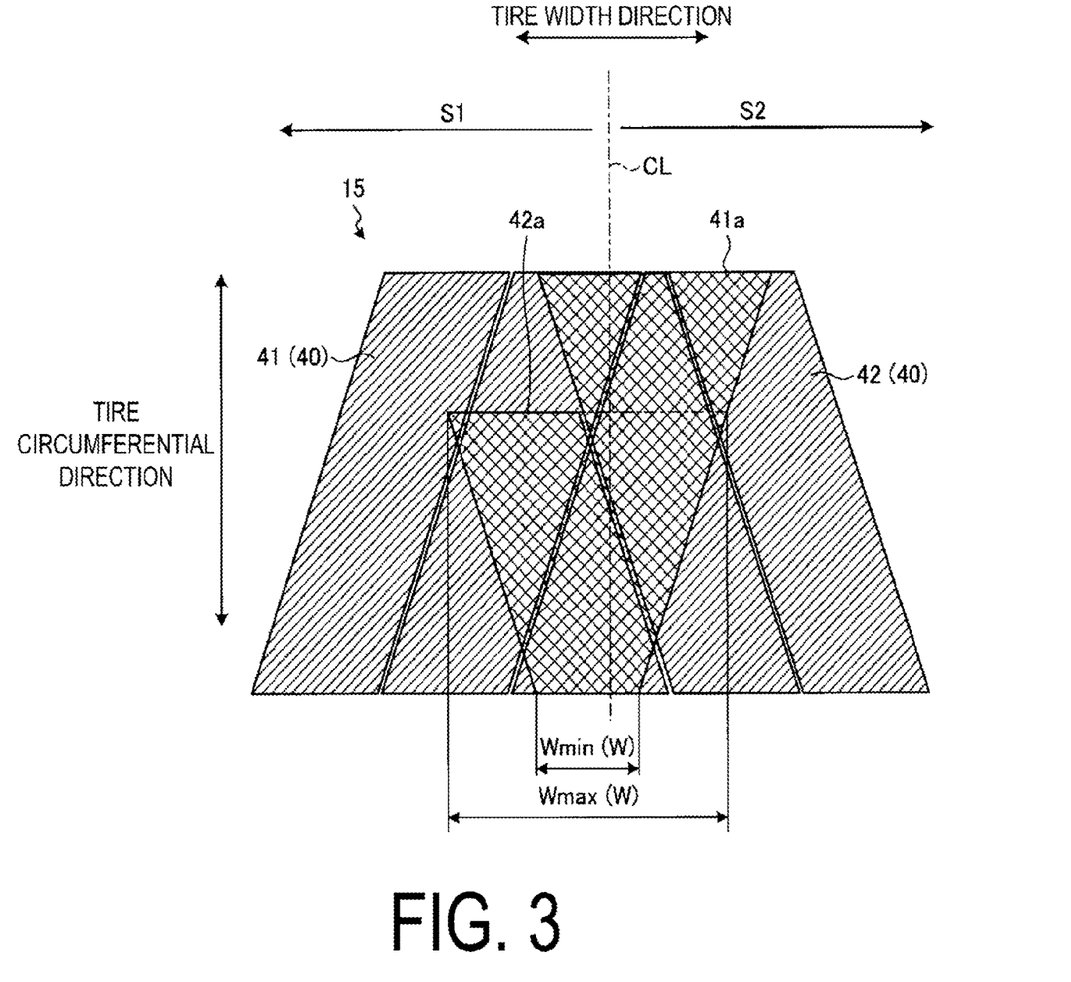
FIG. 3 is a schematic view illustrating vicinities of inner end portions of a first cover material and a second cover material of a belt cover layer, the schematic view being taken along a direction of arrow A-A of FIG. 2.
Figure 4:
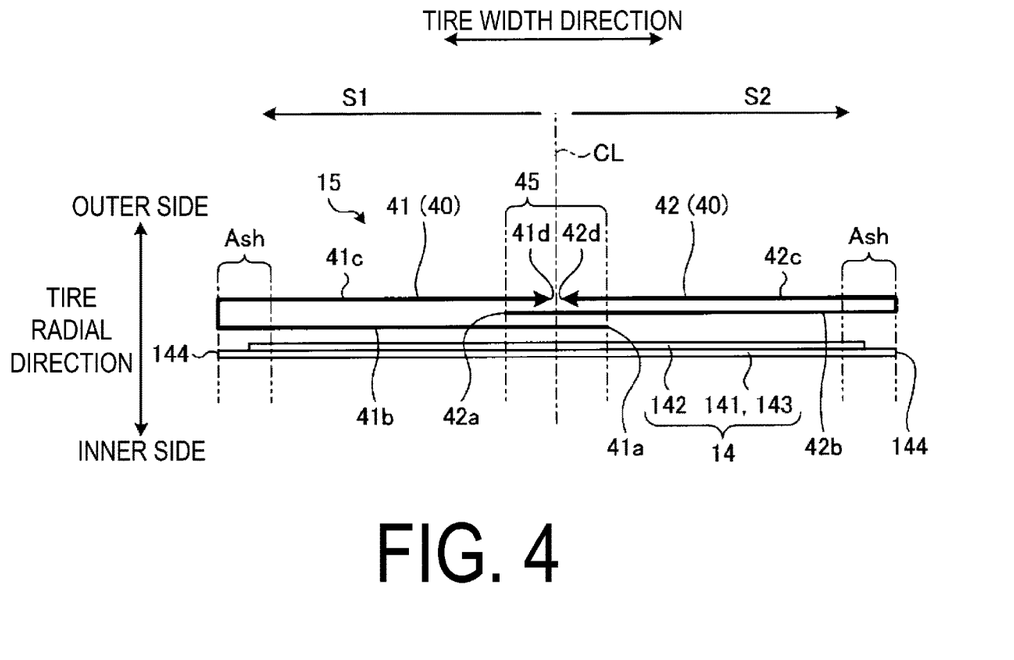
FIG. 4 is a schematic view illustrating arrangement positions of the first cover material and the second cover material illustrated in FIG. 3.

FIG. 2 is a detailed view of the tread portion 2 illustrated in FIG. 1. FIG. 3 is a schematic view illustrating vicinities of inner end portions 41a, 42a of a first cover material 41 and a second cover material 42 of the belt cover layer 15, the schematic view being taken along a direction of arrow A-A of FIG. 2. FIG. 4 is a schematic view illustrating arrangement positions of the first cover material 41 and the second cover material 42 illustrated in FIG. 3. The belt cover layer 15 disposed on the outer side in the tire radial direction of the belt layer 14 is formed by spirally winding belt cover materials 40, which are band-like members formed in a band shape, on the outer side in the tire radial direction of the belt layer 14 around the tire rotation axis. The belt cover material 40, which is the band-like member, has a width within a range of 5 mm or more and 15 mm or less. The belt cover materials 40 are reinforcing layer constituent members constituting the belt cover layer 15, and a cord constituting the belt cover layer 15 is formed by being coated with a coating rubber.

The belt cover material 40 includes a first cover material 41 and a second cover material 42. The first cover material 41 and the second cover material 42 are each formed in a band shape, and are each spirally wound on the outer side of the belt layer 14 in the tire radial direction. In addition, the first cover material 41 and the second cover material 42 are members of an identical type and are each formed by coating the cords constituting the belt cover layer 15 with coating rubbers. In other words, the first cover material 41 and the second cover material 42 have a configuration in which, for example, widths and thicknesses, wire diameters of the cords and intervals of the cords, and materials of the cords and the coating rubbers can be regarded as being identical.

Additionally, the arrangement positions of the first cover material 41 and the second cover material 42 in the tire width direction are disposed at sides opposite to each other with the tire equatorial plane CL as the center therebetween, and the first cover material 41 and the second cover material 42 partially overlap at a position at or near the center in the tire width direction. With the first cover material 41 and the second cover material 42, in a case where one side with respect to the tire equatorial plane CL in the tire width direction is defined as a first side S1 and the other side with respect to the tire equatorial plane CL in the tire width direction is defined as a second side S2, most of the first cover material 41 is disposed from the tire equatorial plane CL to a shoulder region Ash on the first side S1 side, and part of the first cover material 41 is disposed on the second side S2 with respect to the tire equatorial plane CL in the vicinity of the tire equatorial plane CL. Thus, the first cover material 41 is disposed from a position between a shoulder region Ash on the second side S2 and the tire equatorial plane CL to the shoulder region Ash on the first side S1. In addition, most of the second cover material 42 is disposed from the tire equatorial plane CL to the shoulder region Ash on the second side S2 side, and part of the second cover material 42 is disposed on the first side S1 with respect to the tire equatorial plane CL in the vicinity of the tire equatorial plane CL. Thus, the second cover material 42 is disposed from a position between the shoulder region Ash on the first side S1 and the tire equatorial plane CL to the shoulder region Ash on the second side S2.

Note that the shoulder region Ash in this case is a region between a position P at 85% of the width of the belt layer 14 in the tire width direction and an end portion 144 of the belt layer 14 in the tire width direction. Specifically, in a tire meridian cross-section, the shoulder region Ash is a region positioned between two shoulder region boundary lines Lsh. The shoulder region boundary lines Lsh are respective lines perpendicularly extending from the position P at 85% of the width of a widest belt 143 in the tire width direction, which has the widest width in the tire width direction among the plurality of belts 141, 142 of the belt layer 14, and the end portion 144 of the widest belt 143 to the tire inner surface 18. The shoulder regions Ash thus defined are defined on both sides of the tire equatorial plane CL in the tire width direction, and are positioned on respective both sides of the tire equatorial plane CL in the tire width direction.

In the present embodiment, of the two layers of the belts 141, 142 included in the belt layer 14, a width of the belt 141 in the tire width direction positioned on the inner side in the tire radial direction is wider than a width of the other belt 142 in the tire width direction, and the belt 141 positioned on the inner side in the tire radial direction is the widest belt 143.

Also, the positions P at 85% of the width of the widest belt 143 in the tire width direction are positions of end portions of a 85% region when a region of 85% of the width of the widest belt 143 in the tire width direction is evenly distributed on both sides in the tire width direction with the center of the widest belt 143 in the tire width direction or the position of the tire equatorial plane CL as the center. Accordingly, intervals between the positions P at 85% of the width of the widest belt 143 in the tire width direction and the end portions 144 of the widest belt 143 are identical in size between both sides of the tire equatorial plane CL in the tire width direction.

The shoulder region Ash defined in this manner is defined by a shape in a state in which the pneumatic tire 1 is mounted on a regular rim and is inflated to the regular internal pressure. Here, "regular rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organization). Moreover, a regular internal pressure refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In addition, the first cover material 41 and the second cover material 42 are each spirally wound on the outer side of the belt layer 14 in the tire radial direction. The direction of the spiral is a direction that is symmetrical when viewed with the tire equatorial plane CL as its center. In other words, the first cover material 41 and the second cover material 42 have the same winding direction in the tire circumferential direction in heading from the tire equatorial plane CL side to the shoulder region Ash sides. Specifically, the direction of winding of the first cover material 41 in the tire circumferential direction in heading from the tire equatorial plane CL side to the shoulder region Ash side on the first side S1, and the direction of winding of the second cover material 42 in the tire circumferential direction in heading from the tire equatorial plane CL side to the shoulder region Ash side on the second side S2 are the identical direction.

As described above, the first cover material 41 and the second cover material 42 constituting the belt cover layer 15 are each spirally wound and layered in the tire radial direction. Specifically, the first cover material 41 includes a base portion 41b and a folded back portion 41c disposed on the outer side of the base portion 41b in the tire radial direction and layered with respect to the base portion 41b. Of the base portion 41b of the folded back portion 41c of the first cover material 41, the base portion 41b is disposed from the position between the shoulder region Ash on the second side S2 and the tire equatorial plane CL to the shoulder region Ash on the first side S1. Also, the folded back portion 41c is disposed from the shoulder region Ash on the first side S1 to the tire equatorial plane CL, at a position on the outer side of the base portion 41b in the tire radial direction.

The first cover material 41 is formed of a band-like member, so one end of the first cover material 41, which is the band-like member, is positioned on either one of the base portion 41b and the folded back portion 41c that are layered in the tire radial direction, and the other end is positioned on the other one of the base portion 41b and the folded back portion 41c. Specifically, of the both ends of the first cover material 41 formed of the band-like member, the inner end portion 41a, which is the end portion located on the base portion 41b side, is located between the shoulder region Ash on the second side S2 and the tire equatorial plane CL, and an outer end portion 41d, which is the end portion positioned on the folded back portion 41c side, is located on the tire equatorial plane CL or in the vicinity of the tire equatorial plane CL.

The second cover material 42 also includes a base portion 42b and a folded back portion 42c disposed on the outer side of the base portion 42b in the tire radial direction and layered with respect to the base portion 42b. Of the base portion 42b and the folded back portion 42c of the second cover material 42, the base portion 42b is disposed from the position between the shoulder region Ash on the first side S1 and the tire equatorial plane CL to the shoulder region Ash on the second side S2. Also, the folded back portion 42c is disposed from the shoulder region Ash on the second side S2 to the tire equatorial plane Cl, at a position on the outer side of the base portion 42b in the tire radial direction.

As with the first cover material 41, the second cover material 42 is also formed of a band-like member, so one end of the second cover material 42, which is the band-like member, is positioned on either one of the base portion 42b and the folded back portion 42c that are layered in the tire radial direction, and the other end is positioned on the other one of the base portion 42b and the folded back portion 42c. Specifically, of the both ends of the second cover material 42 formed of the band-like member, the inner end portion 42a, which is the end portion located on the base portion 42b side, is located between the shoulder region Ash on the first side S1 and the tire equatorial plane CL, and the outer end portion 42d, which is the end portion located on the folded back portion 42c side, is located on the tire equatorial plane Cl or in the vicinity of the tire equatorial plane CL.

Furthermore, the first cover material 41 and the second cover material 42 have an overlapping portion 45 where the first cover material 41 and the second cover material 42 overlap in the tire radial direction at a position where positions in the tire width direction are identical to each other.

Figure 5:
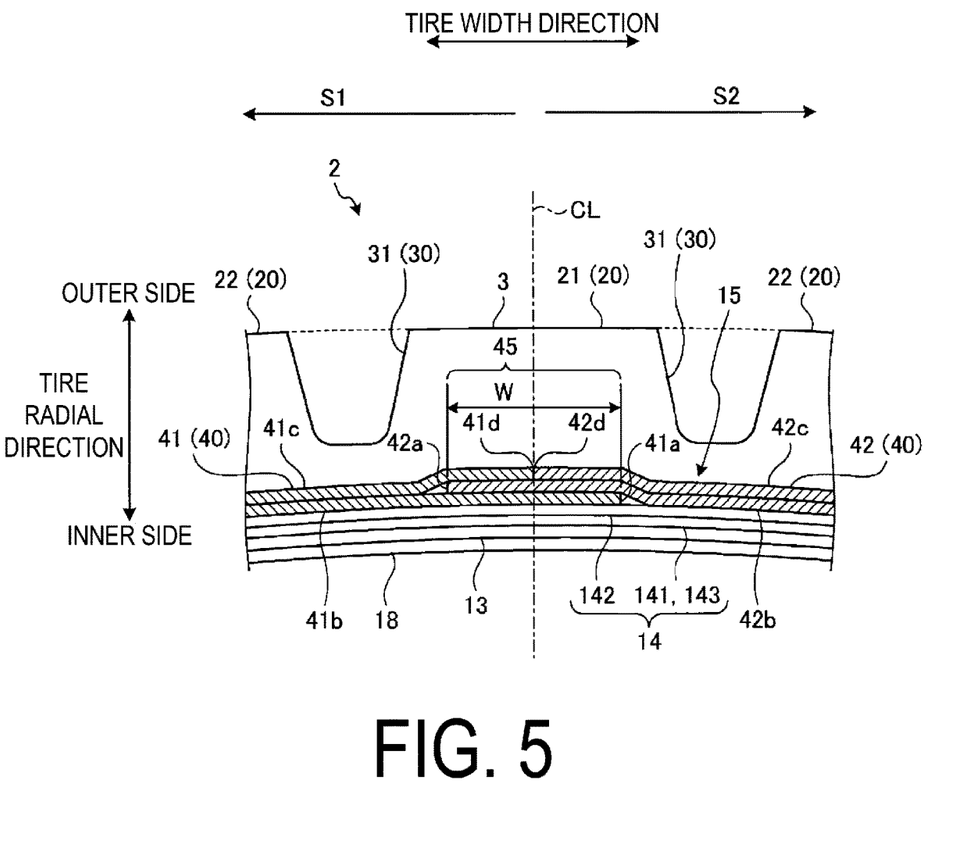
FIG. 5 is a detailed view of a center land portion illustrated in FIG. 2.

FIG. 5 is a detailed view of the center land portion 21 illustrated in FIG. 2. The inner end portion 41a, which is the end portion located on the base portion 41b side in the first cover material 41, is positioned on the second side S2, and the inner end portion 42a, which is the end portion located on the base portion 42b side in the second cover material 42, is positioned on the first side S1. The overlapping portion 45 is formed at a position between the inner end portion 41a of the first cover material 41 and the inner end portion 42a of the second cover material 42. Thus, the overlapping portion 45 is formed so as to go across the tire equatorial plane CL in the tire width direction, and at least a part of the overlapping portion 45 is positioned on the inner side in the tire radial direction of the center land portion 21.

In addition, a portion of the base portion 41b of the first cover material 41 that is located on the overlapping portion 45 and a portion of the base portion 42b of the second cover material 42 that is located on the overlapping portion 45 are layered in the tire radial direction. In the present embodiment, in the portions of the base portion 41b of the first cover material 41 and the base portion 42b of the second cover material 42 that are layered in the tire radial direction, the base portion 42b of the second cover material 42 is layered on the outer side of the base portion 41b of the first cover material 41 in the tire radial direction.

The folded back portion 41c of the first cover material 41 is disposed from the shoulder region Ash of the first side S1 to the tire equatorial plane CL, and the outer end portion 41d ends at the tire equatorial plane CL. The folded back portion 42c of the second cover material 42 is disposed from the shoulder region Ash of the second side S2 to the tire equatorial plane CL, and the outer end portion 42d ends at the tire equatorial plane CL. Since the first cover material 41 and the second cover material 42 are disposed in this manner, the two layers of the base portion 41b and the folded back portion 41c of the first cover material 41 or the two layers of the base portion 42b and the folded back portion 42c of the second cover material 42 are wound in a position on the inner side of the second land portion 22 or the shoulder land portion 23 in the tire radial direction.

In contrast, in the portion on the inner side of the center land portion 21 in the tire radial direction where the overlapping portion 45 is located, the first cover material 41 and the second cover material 42 are wound so as to overlap in three layers in the tire radial direction. In other words, in the portion of the overlapping portion 45 located closer to the first side S1 with respect to the tire equatorial plane CL, a total of three layers are layered, including the two layers of the base portion 41b and the folded back portion 41c of the first cover material 41 and the range from the position of the tire equatorial plane CL in the base portion 42b of the second cover material 42 to the inner end portion 42a. In addition, in the portion of the overlapping portion 45 located closer to the second side S2 with respect to the tire equatorial plane CL, a total of three layers are layered, including the two layers of the base portion 42b and the folded back portion 42c of the second cover material 42 and the range from the position of the tire equatorial plane CL in the base portion 41b of the first cover material 41 to the inner end portion 41a.

As such, the overlapping portion 45 is layered with three layers of the belt cover material 40 in the range in the tire width direction between the position of the inner end portion 41a of the first cover material 41 in the tire width direction and the position of the inner end portion 42a of the second cover material 42 in the tire width direction, the range defining the range of the overlapping portion 45 in the tire width direction. The overlapping portion 45 is a portion where more belt cover materials 40 are layered compared with the position other than the overlapping portion 45 in the range in which the belt cover layer 15 is disposed. Thus, in the present embodiment, for the belt cover layer 15, two layers of the belt cover materials 40 are layered in a position other than the overlapping portion 45, and the belt cover material 40 is layered in three layers in the overlapping portion 45. In other words, in the belt cover layer 15, a so-called full cover is formed of two layers of the belt cover material 40 so as to be disposed throughout the belt layer 14 in the tire width direction, and the overlapping portion 45 extending across the tire equatorial plane CL in the tire width direction is formed by three layers of the belt cover material 40.

In addition, in the first cover material 41 and the second cover material 42, the position of the inner end portion 41a of the first cover material 41 in the tire circumferential direction and the position of the inner end portion 42a of the second cover material 42 in the tire circumferential direction differ from each other, said positions defining the range of the overlapping portion 45 in the tire width direction.

Here, because the first cover material 41 and the second cover material 42 are spirally disposed around the tire rotation axis, both are inclined in the tire width direction with respect to the tire circumferential direction. Furthermore, the position of the inner end portion 41a of the first cover material 41 in the tire circumferential direction differs from the position of the inner end portion 42a of the second cover material 42 in the tire circumferential direction. Thus, the overlapping portion 45 formed by overlapping the first cover material 41 and the second cover material 42 in the tire radial direction has a width W in the tire width direction that varies depending on the position in the tire circumferential direction.

The overlapping portion 45 having the width W varying in the tire width direction has a minimum width W min (see FIG. 3), which is a width at a position where the width W in the tire width direction is minimized, of 5 mm or more, and a maximum width W max (see FIG. 3), which is a width at a position where the width Win the tire width direction is maximized, of 40 mm or less. In other words, the overlapping portion 45 has the width W in the tire width direction within a range of 5 mm or more and 40 mm or less.

Method for Manufacturing Pneumatic Tire

Next, the manufacturing method for the pneumatic tire 1 according to the embodiment will be described. To manufacture the pneumatic tire 1, first, processing is performed on each of the members constituting the pneumatic tire 1, and the processed members are assembled. That is, the rubber members, such as the tread rubber layer 4, and the respective members, such as the bead core 11, the carcass layer 13, the belt layer 14, and the belt cover layer 15 are each processed and the processed members are assembled. Of these, the belt cover layer 15 is disposed on the outer side in the tire radial direction of the belt layer 14 by spirally winding the band-like belt cover materials 40 on the outer side of the belt layer 14 in the tire radial direction around the tire rotation axis.

As the belt cover materials 40, which are the members for forming the belt cover layer 15, the first cover material 41 (see FIG. 3) and the second cover material 42 (see FIG. 3) are used in the present embodiment. A step of disposing the belt cover layer 15 on the outer side of the belt layer 14 in the tire radial direction includes: a step of spirally winding the first cover material 41 from the position between the shoulder region Ash on the second side S2 (see FIG. 2) and the tire equatorial plane CL to the shoulder region Ash on the first side S1 (see FIG. 2); a step of spirally winding the second cover material 42 from the position between the shoulder region Ash on the first side S1 and the tire equatorial plane CL to the shoulder region Ash on the second side S2; a step of spirally winding the first cover material 41 from the shoulder region Ash on the first side S1 to the tire equatorial plane CL; and a step of spirally winding the second cover material 42 from the shoulder region Ash on the second side S2 to the tire equatorial plane CL.

When the first cover material 41 and the second cover material 42 are wound spirally, the first cover material 41 and the second cover material 42 are wound spirally at approximately the same pitch as the widths of the first cover material 41 and the second cover material 42. In other words, in the step of spirally winding the first cover material 41 and the second cover material 42, adjacent revolution portions of the first cover material 41 and the second cover material 42 do not overlap, and the first cover material 41 and the second cover material 42 are wound at a pitch that the adjacent revolution portions do not separate from each other. Thus, preferably, the first cover material 41 and the second cover material 42 are wound with edge portions of the adjacent revolution portions in contact with each other. When the adjacent revolution portions overlap, a width of the overlapping portions is preferably 3 mm or less. When the adjacent revolution portions are separated from each other, a distance therebetween is preferably 3 mm or less.

Figure 6:
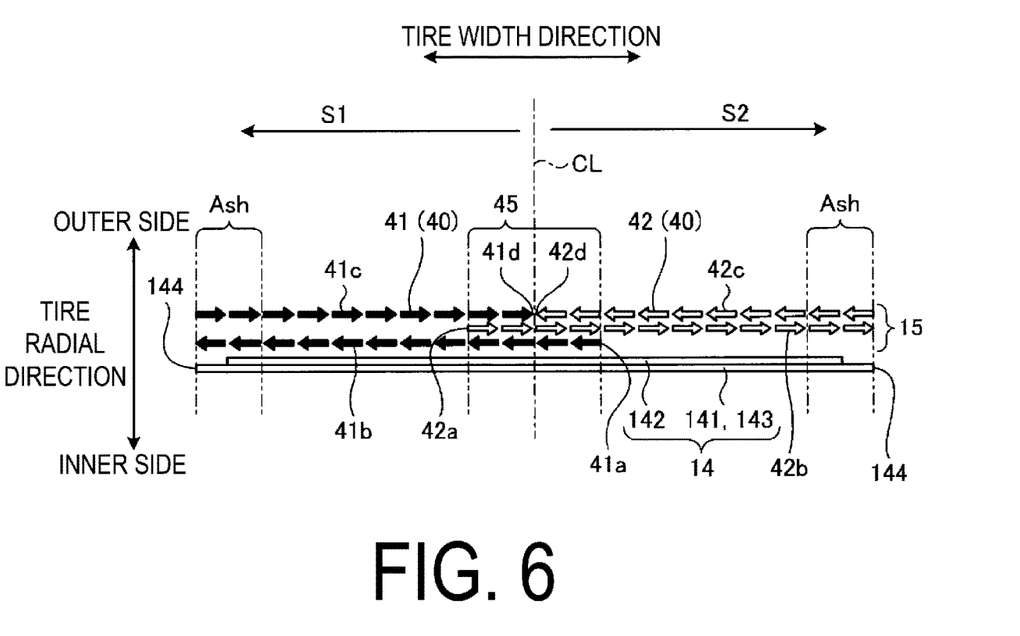
FIG. 6 is a schematic view for explaining directions in which the first cover material and the second cover material are wound.

FIG. 6 is a schematic view for explaining directions in which the first cover material 41 and the second cover material 42 are wound. In the step of winding the first cover material 41, first, the first cover material 41 is spirally wound toward the shoulder region Ash on the first side S1 with the inner end portion 41a of the first cover material 41 being positioned between the shoulder region Ash on the second side S2 and the tire equatorial plane CL. In other words, winding of the first cover material 41 starts from the inner end portion 41a, and the first cover material 41 is wound from the second side S2 side to the shoulder region Ash of the first side S1, thereby forming the base portion 41b of the first cover material 41. Once the base portion 41b of the first cover material 41 is formed, the first cover material 41 is folded toward the outer side in the tire radial direction and back and wound in a spiral form from the shoulder region Ash of the first side S1 toward the tire equatorial plane CL. Specifically, the first cover material 41 that is folded toward the outer side in the tire radial direction and back, in the shoulder region Ash, is wound from the shoulder region Ash of the first side S1 to the tire equatorial plane CL at the outer side of the base portion 41b of the first cover material 41 in the tire radial direction, and the outer end portion 41d is positioned on the tire equatorial plane CL or in the vicinity of the tire equatorial plane CL. As a result, the folded back portion 41c of the first cover material 41 is formed.

Also, in the step of winding the second cover material 42, first, the second cover material 42 is spirally wound toward the shoulder region Ash on the second side S2 with the inner end portion 42a of the second cover material 42 being positioned between the shoulder region Ash on the first side S1 and the tire equatorial plane CL. In other words, winding of the second cover material 42 starts from the inner end portion 42a, and the second cover material 42 is wound from the first side S1 side to the shoulder region Ash of the second side S2, thereby forming the base portion 42b of the second cover material 42. Once the base portion 42b of the second cover material 42 is formed, the second cover material 42 is folded toward the outer side in the tire radial direction and back and wound in a spiral form from the shoulder region Ash of the second side S2 toward the tire equatorial plane CL. Specifically, the second cover material 42 that is folded toward the outer side in the tire radial direction and back, in the shoulder region Ash, is wound from the shoulder region Ash of the second side S2 to the tire equatorial plane CL at the outer side of the base portion 42b of the second cover material 42 in the tire radial direction, and the outer end portion 42d is positioned on the tire equatorial plane CL or in the vicinity of the tire equatorial plane CL. As a result, the folded back portion 42c of the second cover material 42 is formed.

Accordingly, in the step of winding the first cover material 41, while the inner end portion 41a of the first cover material 41 is positioned on the second side S2, most of the first cover material 41 is wound in two layers on the first side S1. In the step of winding the second cover material 42, while the inner end portion 42a of the second cover material 42 is positioned on the first side S1, the most part of the second cover material 42 is wound in two layers on the second side S2.

Note that the outer end portion 41d of the first cover material 41 is preferably located on the tire equatorial plane CL. When positioning the outer end portion 41d in the vicinity of the tire equatorial plane CL, the outer end portion 41d is preferably positioned in the vicinity of the tire equatorial plane CL while being positioned on the second side S2. Similarly, the outer end portion 42d of the second cover material 42 is preferably located on the tire equatorial plane CL. When positioning the outer end portion 42d in the vicinity of the tire equatorial plane CL, the outer end portion 42d is preferably positioned in the vicinity of the tire equatorial plane CL while being positioned on the first side S1. The outer end portion 41d of the first cover material 41 and the outer end portion 42d of the second cover material 42 preferably have a distance from the tire equatorial plane CL within a range of 0 mm or more and 20 mm or less.

In addition, when the first cover material 41 and the second cover material 42 are folded back at the shoulder regions Ash, the first cover material 41 and the second cover material 42 are preferably folded in such a manner as to cover the end portion 144 of the belt layer 14 in the tire width direction. In other words, the belt cover material 40 is preferably disposed in such a manner that the width of the belt cover layer 15 in the tire width direction is equal to or greater than the width of the belt layer 14 in the tire width direction, and that the entire region of the belt layer 14 in the tire width direction can be covered from the outer side in the tire radial direction.

The step of winding the first cover material 41 and the step of winding the second cover material 42 are performed with the times overlapping. In other words, at least a part of the step of winding the first cover material 41 and at least a part of the step of winding the second cover material 42 in the step of winding the first cover material 41 and the step of winding the second cover material 42 are performed at the same time. For example, the step of spirally winding the first cover material 41 from the position between the shoulder region Ash on the second side S2 and the tire equatorial plane CL to the shoulder region Ash on the first side S1, and the step of spirally winding the second cover material 42 from the position between the shoulder region Ash on the first side S1 and the tire equatorial plane CL to the shoulder region Ash on the second side S2, are executed in parallel at the same time. Additionally, the step of spirally winding the first cover material 41 from the shoulder region Ash on the first side S1 to the tire equatorial plane CL, and the step of spirally winding the second cover material 42 from the shoulder region Ash on the second side S2 to the tire equatorial plane CL, are executed in parallel at the same time. Thus, in the step of winding the first cover material 41 and the step of winding the second cover material 42, the winding of the first cover material 41 and the winding of the second cover material 42 are started simultaneously.

When winding the first cover material 41 and the second cover material 42 on the outer side of the belt layer 14 in the tire radial direction, the first cover material 41 and the second cover material 42 are wound, starting from the inner end portions 41a, 42a. In so doing, the position of the inner end portion 41a of the first cover material 41 in the tire circumferential direction and the position of the inner end portion 42a of the second cover material 42 in the tire circumferential direction are caused to differ from each other. As a result, the inner end portion 41a of the first cover material 41 and the inner end portion 42a of the second cover material 42 are separated from each other. In the first cover material 41 and the second cover material 42, winding from the inner end portion 41a of the first cover material 41 and winding from the inner end portion 42a of the second cover material 42 are started simultaneously, with the inner end portions 41a, 42a being separated as described above.

Note that a distance by which the inner end portion 41a of the first cover material 41 and the inner end portion 42a of the second cover material 42 are separated in a direction along the tire circumferential direction is preferably within a range of 5 mm or more and 500 mm or less.

By disposing the first cover material 41 and the second cover material 42 in a predetermined range while spirally winding the first cover material 41 and the second cover material 42 around the tire rotation axis at the outer side of the belt layer 14 in the tire radial direction, the belt cover layer 15 is disposed over the range in the tire width direction where the belt layer 14 is disposed at the outer side of the belt layer 14 in the tire radial direction.

Also, in the step of winding the first cover material 41 and the step of winding the second cover material 42, the portion of the first cover material 41 that forms the base portion 41b and the portion that forms the folded back portion 41c are layered in the tire radial direction, and the portion of the second cover material 42 that forms the base portion 42b and the portion that forms the folded back portion 42c are layered in the tire radial direction. However, in the first cover material 41 and the second cover material 42 as well, the part thereof that are identical in position in the tire width direction are layered in the tire radial direction. In other words, in the steps of winding the first cover material 41 and the second cover material 42, in the region between the portion of the first cover material 41 at the second side S2 and the portion of the second cover material 42 at the first side S1, the first cover material 41 and the second cover material 42, as well as the first cover materials 41 and the second cover materials 42, are layered in the tire radial direction, thereby forming the overlapping portions 45. In other words, in the step of winding the first cover material 41 and the step of winding the second cover material 42, not only the first cover materials 41 and the second cover materials 42 but also the first cover material 41 and the second cover material 42 are layered in the tire radial direction, at the position extending between the portion located in the first cover material 41 at the second side S2 and the portion located in the second cover material 42 at the first side S1. As a result, the overlapping portion 45 is formed in which the number of the belt cover materials 40 overlapped in the tire radial direction is greater than other portions.

At this time, in the step of winding the first cover material 41 and the step of winding the second cover material 42, since both of the first cover material 41 and the second cover material 42 are spirally wound, the first cover material 41 and the second cover material 42 are wound to be inclined in the tire width direction with respect to the tire circumferential direction. In addition, the first cover material 41 and the second cover material 42 are wound such that the position of the inner end portion 41a of the first cover material 41 in the tire circumferential direction and the position of the inner end portion 42a of the second cover material 42 in the tire circumferential direction differ from each other. Accordingly, the overlapping portion 45 is formed in a configuration in which the width W in the tire width direction varies depending on the position in the tire circumferential direction.

Functions and Effects

To mount the pneumatic tire 1 according to the present embodiment on a vehicle, a rim wheel R (see FIG. 7) is fitted to the bead portion 10 to mount the pneumatic tire 1 on the rim wheel R, and then the pneumatic tire 1 is inflated by being filled with air and is mounted on the vehicle. The orientation when the pneumatic tire 1 is mounted on the vehicle may be such that the first side S1 is on the inner side in the vehicle width direction and the second side S2 is on the outer side in the vehicle width direction, or the first side S1 is on the outer side in the vehicle width direction and the second side S2 is on the inner side in the vehicle width direction. Note that in the pneumatic tire 1 in which the orientation when the pneumatic tire 1 is mounted on a vehicle is designated, the relationship between the inner side and the outer side in a vehicle mounting direction and the first side S1 and the second side S2 may be preset.

The pneumatic tire 1 according to the present embodiment is, for example, the pneumatic tire 1 that can accommodate use at high loads, such as the pneumatic tire 1 with EXTRA LOAD standard. As such, the pneumatic tire 1 can be used with an air pressure at inflation in a relatively high state.

Thus, when the pneumatic tire 1 is used at a high load, the pneumatic tire 1 is used at an increased air pressure. When the vehicle equipped with the pneumatic tires 1 travels, the pneumatic tire 1 rotates with the ground contact surface 3 at a portion positioned on a lower side in the ground contact surface 3 in contact with the road surface. The vehicle is driven by transferring a driving force or a braking force to the road surface, using the frictional force between the ground contact surface 3 and the road surface, or by generating a turning force.

For example, in a case where the vehicle on which the pneumatic tires 1 are mounted travels on a dry road surface, the vehicle travels mainly by transmitting a driving force or a braking force to the road surface or generating a turning force by a frictional force between the ground contact surface 3 and the road surface. When the vehicle travels on a wet road surface, the vehicle travels in such a way that water between the ground contact surface 3 and the road surface enters grooves, such as the main grooves 30 and the lug grooves, and the water between the ground contact surface 3 and the road surface is drained through these grooves. Accordingly, the ground contact surface 3 is easily grounded on the road surface, and the frictional force between the ground contact surface 3 and the road surface allows the vehicle to travel as desired.

Additionally, while the vehicle is traveling, the pneumatic tire 1 is subjected to a load associated with a weight of a vehicle body, acceleration/deceleration, and turning. Accordingly, a large load acts in the tire radial direction. This load is mainly received by air filled into the pneumatic tire 1, but is also received by the tread portion 2 and the sidewall portion 8 as well as the air inside the pneumatic tire 1. That is, the sidewall portion 8 transmits the load between the bead portion 10 to which the rim wheel R is fitted and the tread portion 2, and the tread portion 2 transmits the load between the sidewall portion 8 and the road surface. Accordingly, the large load acts on the sidewall portion 8 and the tread portion 2 while the vehicle is traveling, and the sidewall portion 8 and the tread portion 2 receive this load while deflecting mainly in the tire radial direction.

Additionally, while the vehicle is traveling, the pneumatic tire 1 rotates, so the position in the ground contact surface 3 that comes into contact with the road surface continuously moves in the tire circumferential direction. In accordance with this, the positions in the sidewall portion 8 and the tread portion 2 deflecting by the load while the vehicle is traveling also move in the tire circumferential direction. Thus, while the vehicle is traveling, the pneumatic tire 1 rotates while repeating the sequential deflection of the respective positions of the sidewall portion 8 and the tread portion 2 on the tire circumferential direction.

Additionally, a projection projecting from a road surface, such as a stone, is possibly present on a road surface on which the vehicle travels, and the vehicle during traveling possibly treads such a projection by the tread portion 2 of the pneumatic tire 1. At this time, when the sidewall portion 8 and the tread portion 2 have a small deflection due to the high air pressure filled in the pneumatic tire 1, the pneumatic tire 1 cannot absorb the change in the shape of the road surface due to the presence of the projection, and the projection possibly penetrates the tread portion 2 of the pneumatic tire 1. That is, in the pneumatic tire 1 with the increased internal pressure, when the projection on the road surface is trodden, the small deflection of the sidewall portion 8 and the tread portion 2 causes the projection to penetrate the tread portion 2, possibly causing a shock burst.

Figure 7:
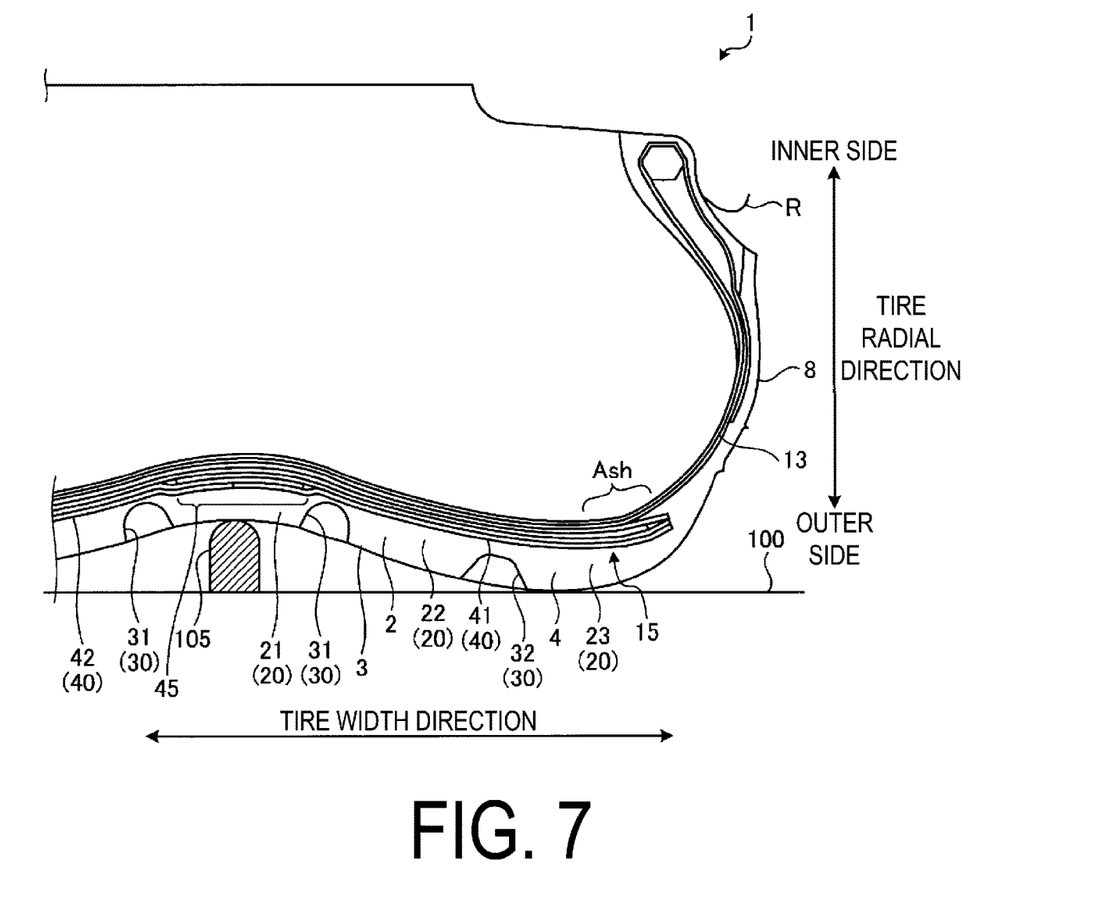
FIG. 7 is an explanatory diagram illustrating a state in which a projection on a road surface is trodden by the pneumatic tire according to an embodiment.

On the other hand, with the pneumatic tire 1 according to the present embodiment, the belt cover layer 15 is formed by the first cover material 41 and the second cover material 42, and the first cover material 41 and the second cover material 42 form the overlapping portion 45 that extends across the tire equatorial plane CL in the tire width direction. Thus, a shock burst that occurs in a case where an internal pressure is increased can be suppressed. FIG. 7 is an explanatory diagram illustrating a state in which a projection 105 on a road surface 100 is trodden by the pneumatic tire 1 according to the embodiment. In the pneumatic tire 1 according to the present embodiment, by overlapping, in the tire radial direction, the portions of the first cover material 41 and the second cover material 42 that extend across the tire equatorial plane CL in the tire width direction, the overlapping portion 45 where more of the belt cover materials 40 are layered compared to the other portions can be formed at the position extending across the tire equatorial plane CL. This increases a strength at break at or near the center in the tire width direction of the tread portion 2. Even when the projection 105 on the road surface 100 is trodden at or near the center land portion 21 where a ground contact pressure is likely to increase, the penetration of the projection 105 through the tread portion 2 can be suppressed. Accordingly, shock bursts caused by the projection 105 being trodden during traveling of the vehicle can be suppressed.

In addition, the first cover material 41 and the second cover material 42 forming the belt cover layer 15 are disposed at the different positions in the tire width direction except for the portion of the overlapping portion 45. Accordingly, the first cover material 41 and the second cover material 42 can be disposed by simultaneously spirally winding the portions other than the overlapping portion 45. As a result, when the belt cover layer 15 is disposed for the purpose of improving shock burst resistance performance, the disposition can be performed with increased productivity. As a result, both shock burst resistance performance and productivity can be achieved in a compatible manner.

The method for manufacturing the pneumatic tire 1 according to the embodiment uses the first cover material 41 and the second cover material 42 as the belt cover materials 40 and includes the step of spirally winding the first cover material 41 from the position between the shoulder region Ash on the second side S2 and the tire equatorial plane CL to the shoulder region Ash on the first side S1; and the step of spirally winding the second cover material 42 from the position between the shoulder region Ash on the first side S1 and the tire equatorial plane CL to the shoulder region Ash on the second side S2. With these steps, the first cover material 41 and the second cover material 42 can be wound simultaneously. The method for manufacturing the pneumatic tire 1 according to the embodiment also includes: the step of spirally winding the first cover material 41 from the shoulder region Ash on the first side S1 to the tire equatorial plane CL; and the step of spirally winding the second cover material 42 from the shoulder region Ash on the second side S2 to the tire equatorial plane CL. With these steps, the first cover material 41 and the second cover material 42 can be wound simultaneously. This accomplishes the shortening of a time taken for disposing the belt cover layer 15, thereby disposing two layers of the full cover at the outer side of the belt layer 14 in the tire radial direction without dropping the productivity.

Further, in the steps of winding the first cover material 41 and the second cover material 42, in the region between the portion of the first cover material 41 located on the second side S2 and the portion of the second cover material 42 located on the first side S1, the first cover material 41 and the second cover material 42, as well as the first cover materials 41 and the second cover materials 42, are layered in the tire radial direction, thereby forming the overlapping portion 45 in which three layers of the belt cover materials 40 are layered. Accordingly, the strength at break at or near the center in the tire width direction of the tread portion 2 where the ground contact pressure is likely to increase can be increased by the overlapping portion 45 of the belt cover layer 15. Thus, even in a case where the projection 105 on the road surface 100 is trodden at or near the center land portion 21, the penetration of the projection 105 through the tread portion 2 can be suppressed, and a shock burst caused by the projection 105 being trodden during traveling of the vehicle can be suppressed. As a result, both shock burst resistance performance and productivity can be achieved in a compatible manner.

Also, in the steps of winding the first cover material 41 and the second cover material 42, the winding of the first cover material 41 and the winding of the second cover material 42 are simultaneously started. Thus, the time required for winding the belt cover material 40 constituting the belt cover layer 15 can be further shortened. Accordingly, the shortening of the time taken for disposing the belt cover layer 15 can be achieved more reliably. Thus, productivity can be more reliably improved.

Additionally, since the overlapping portion 45 has the width W in the tire width direction within the range of 5 mm or more and 40 mm or less, a strength of the overlapping portion 45 can be ensured more reliably while suppressing an excessive increase in the weight of the belt cover layer 15. In other words, in a case where the width W of the overlapping portion 45 is less than 5 mm, the strength of the overlapping portion 45 may not be ensured securely because the width W of the overlapping portion 45 is too narrow. In this case, even when the overlapping portion 45 is formed, it may be difficult to effectively improve the strength at break at or near the center in the tire width direction of the tread portion 2, and this may make it difficult to effectively suppress the projection 105 trodden by the tread portion 2 from penetrating through the tread portion 2. When the width W of the overlapping portion 45 is greater than 40 mm, the width W of the overlapping portion 45 is excessively large, so there is a possibility that the belt cover material 40 used becomes excessively large. In this case, the weight of the belt cover layer 15 possibly excessively increases, and the weight of the pneumatic tire 1 possibly excessively increases due to the provision of the overlapping portion 45.

In contrast, when the width W of the overlapping portion 45 is in the range of 5 mm or more and 40 mm or less, the strength of the overlapping portion 45 can be ensured more reliably while suppressing the excessive increase in the weight of the belt cover layer 15, and the strength at break at or near the center in the tire width direction of the tread portion 2 where the ground contact pressure is likely to increase can be more reliably improved. As a result, while the increase in the weight of the pneumatic tire 1 is suppressed, shock burst resistance performance can be improved.

MODIFIED EXAMPLES

In the embodiments described above, four main grooves 30 are formed, but the number of main grooves 30 may be other than four. In the embodiments described above, although the center land portion 21 is positioned on the tire equatorial plane CL, the land portion 20 needs not to be positioned on the tire equatorial plane CL. For example, the main groove 30 may be positioned on the tire equatorial plane CL. When the main groove 30 is positioned on the tire equatorial plane CL, at least a part of the overlapping portion 45 of the belt cover layer 15 is preferably positioned on the inner side in the tire radial direction of the land portion 20 closest to the tire equatorial plane CL among the plurality of land portions 20.

Examples

Figure 8:
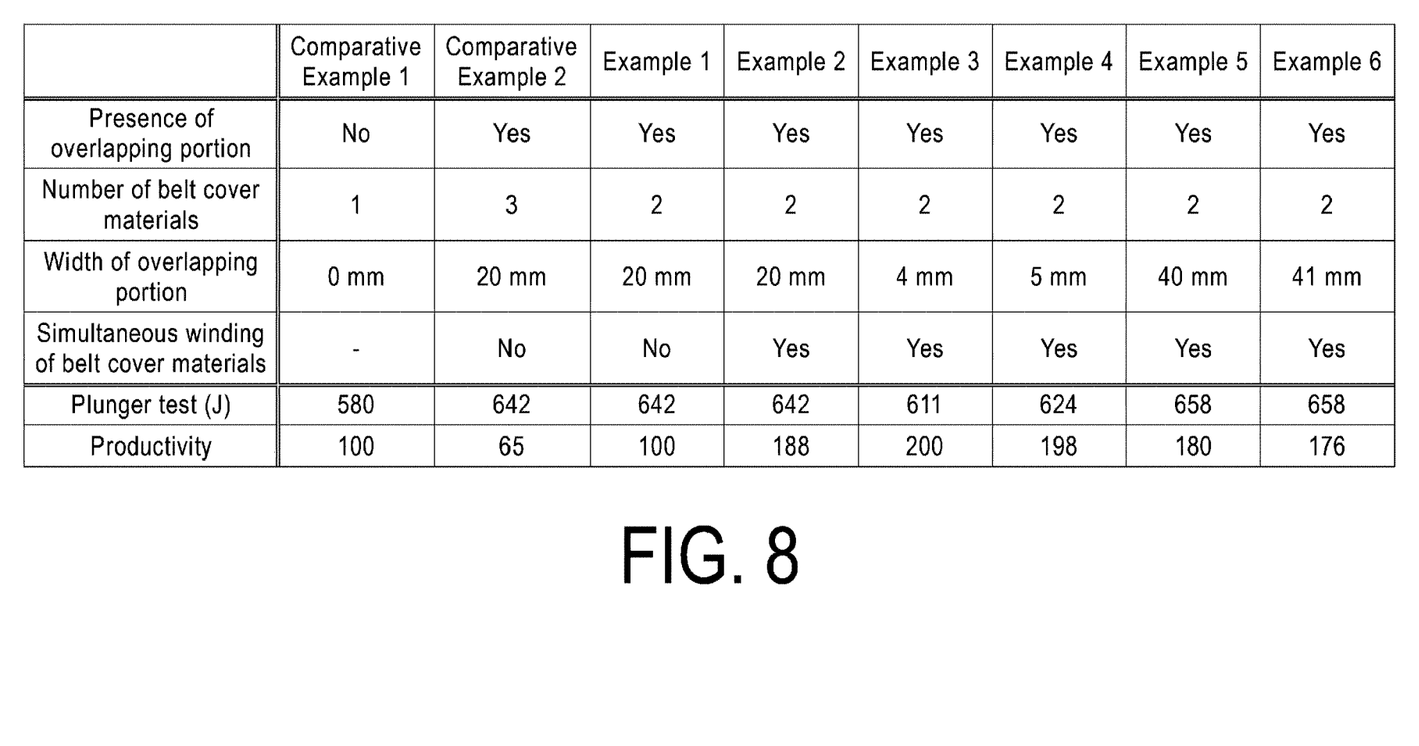
FIG. 8 is a table showing results of performance evaluation tests on methods of manufacturing pneumatic tires.

FIG. 8 is a table showing results of performance evaluation tests on methods of manufacturing pneumatic tires. The following describes performance evaluation tests performed on the pneumatic tire 1 manufactured by the method for manufacturing the pneumatic tire 1 according to the embodiments of the present technology and performed on pneumatic tires manufactured by manufacturing methods according to comparative examples. For the performance evaluation tests, a plunger test, which is an evaluation test for shock burst resistance performance, and a test on productivity during manufacturing of the tire were performed.

The performance evaluation tests were performed using the pneumatic tire 1 having the nominal size of 275/40ZR19 105Y of the tire defined by JATMA and mounted on a standard rim wheel of JATMA having a rim size of 19×9.5 J. The evaluation method for each of the test items was evaluated for the plunger test by filling the test tire with an air pressure of a regular internal pressure, performing a plunger breakage test, in accordance with JIS (Japanese Industrial Standard) K6302 with a plunger diameter of 19 mm and an insertion speed of 50 mm/minute, and measuring a tire breaking energy J. The evaluation results of the plunger test show that the greater the measured tire breaking energy J is, the superior a tire strength is and the superior shock burst resistance performance is.

In addition, regarding productivity, a time required for winding the belt cover materials 40 in the step of winding the belt cover materials 40 during the manufacturing of the tire was measured. The productivity is expressed as index evaluations of a reciprocal of the measured time with Conventional Example 1 described below being assigned as 100. Larger index values indicate shorter winding time and higher productivity.

The performance evaluation tests were conducted on eight types of pneumatic tires including Examples 1 to 6 that are examples of the pneumatic tires 1 manufactured by the method for manufacturing the pneumatic tire 1 according to the embodiments of the present technology, and Comparative Examples 1 and 2 that are examples of pneumatic tires manufactured by manufacturing methods as compared with the method for manufacturing the pneumatic tire 1 according to the embodiments of the present technology. Of these pneumatic tires, the pneumatic tire of Comparative Example 1 does not include the overlapping portion 45 in the belt cover layer 15. Note that, in the pneumatic tire of Comparative Example 1, the belt cover layer 15 is formed by one full cover belt cover material 40. In the pneumatic tire of Comparative Example 2, the belt cover layer 15 includes the overlapping portion 45, and the overlapping portion 45 is constituted by a single belt cover material 40. In other words, in the pneumatic tire of Comparative Example 2, the overlapping portion 45 is formed by interposing one belt cover material 40 having a narrow width in the tire width direction between two full cover belt cover materials 40, the belt cover material 40 forming the overlapping portion 45.

Thus, in the pneumatic tire of Comparative Example 2, three belt cover materials 40 that constitute the belt cover layer 15 are used.

In contrast, in Examples 1 to 6 that are examples of the pneumatic tires 1 manufactured by the method for manufacturing the pneumatic tire 1 according to the embodiments of the present technology, all of the belt cover layers 15 include the overlapping portion 45, and the belt cover material 40 that constitutes the belt cover layer 15 uses two layers of the first cover material 41 and the second cover material 42. Furthermore, in the pneumatic tires 1 according to Example 1 to 6, the widths W of the overlapping portions 45, and whether to simultaneously wind the plurality of belt cover materials 40 when winding the plurality of belt cover materials 40, vary.

As a result of performing the performance evaluation tests using these pneumatic tires 1, as illustrated in FIG. 8, the pneumatic tires 1 according to Examples 1 to 6 showed that the shock burst resistance performance and the productivity evaluated by the plunger test were not lower than those of Comparative Example 1 and that at least either one of the performances was improved compared with Comparative Examples 1 and 2. In other words, the method for manufacturing the pneumatic tires 1 according to Examples 1 to 6 can achieve both shock burst resistance performance and productivity in a compatible manner.

The invention claimed is:

1. A method for manufacturing a pneumatic tire that disposes a belt cover layer on an outer side of a belt layer in a tire radial direction by winding a band-like belt cover material into a spiral shape around a tire rotation axis, the belt cover material comprising a first cover material and a second cover material, the method comprising:
   a step of spirally winding the first cover material from a position between a shoulder region on a second side and a tire equatorial plane to a shoulder region on a first side, one side in a tire width direction with respect to the tire equatorial plane being defined as the first side and an other side in the tire width direction with respect to the tire equatorial plane being defined as the second side;
   a step of spirally winding the second cover material from a position between the shoulder region on the first side and the tire equatorial plane to the shoulder region on the second side;
   a step of spirally winding the first cover material from the shoulder region on the first side to the tire equatorial plane; and
   a step of spirally winding the second cover material from the shoulder region on the second side to the tire equatorial plane,
   the first cover material and the second cover material being layered in multiple layers in the tire radial direction, in a region between a portion of the first cover material that is located on the second side and a portion of the second cover material that is located on the first side, thereby forming an overlapping portion,
   the shoulder region being defined as a region between a position of 85% of a width of the belt layer in the tire width direction and an end portion of the belt layer in the tire width direction,
   a winding start end of the first cover material being located between the shoulder region of the second side and the tire equatorial plane, and
   a winding start end of the second cover material being located between the shoulder region of the first side and the tire equatorial plane.

2. The method for manufacturing a pneumatic tire according to claim 1, wherein winding of the first cover material and winding of the second cover material are started simultaneously.

3. The method for manufacturing a pneumatic tire according to claim 1, wherein the overlapping portion has a width in the tire width direction within a range of 5 mm or more and 40 mm or less.

4. The method for manufacturing a pneumatic tire according to claim 2, wherein the overlapping portion has a width in the tire width direction within a range of 5 mm or more and 40 mm or less.

* * * * *